United States Patent
Popović et al.

(10) Patent No.: US 6,363,106 B1
(45) Date of Patent: Mar. 26, 2002

(54) METHOD AND APPARATUS FOR DESPREADING OQPSK SPREAD SIGNALS

(75) Inventors: Branislav M. Popović; Göran Klang, both of Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/039,371

(22) Filed: Mar. 16, 1998

(51) Int. Cl.[7] .............................................. H04L 27/30

(52) U.S. Cl. ..................... 375/150; 375/142; 375/143; 375/147; 375/332

(58) Field of Search ................................. 375/130, 151, 375/145, 147, 150, 332, 143, 142; 370/206, 320, 335

(56) References Cited

U.S. PATENT DOCUMENTS

| | | | | |
|---|---|---|---|---|
| 5,237,586 A | * | 8/1993 | Bottomley | 375/206 |
| 5,276,705 A | * | 1/1994 | Higgins | 375/151 |
| 5,361,276 A | * | 11/1994 | Subramanian | 375/130 |
| 5,422,909 A | * | 6/1995 | Love et al. | 375/147 |
| 5,825,810 A | * | 10/1998 | Omura et al. | 375/130 |
| 6,005,887 A | * | 12/1999 | Bottomley et al. | 375/207 |
| 6,134,260 A | * | 10/2000 | Bottomley et al. | 375/150 |

FOREIGN PATENT DOCUMENTS

| | | |
|---|---|---|
| EP | 0 767 544 | 4/1997 |
| EP | 0 847 169 | 6/1998 |
| WO | 96/10879 | 4/1996 |

OTHER PUBLICATIONS

Kim, S.R., et al., A Coherent Dual–Channel QPSK Modulation for CDMA Systems, Proc. of VTC'96, Atlanta, pp. 1848–1852 (Apr. 1996).

Grieco, D.M., The Application of Charge–Coupled Devices to Spread–Spectrum Systems, IEEE Transactions of Communications, vol. 28, No. 9, Chapter lllC, pp. 1699, Figure 7.

Lee, D.W., et al., Development of the Base Station Transceiver Subsystem in the CDMA Mobile System, ETRI Journal, vol. 19, No. 3, pp. 116–140 (Oct. 1997).

* cited by examiner

Primary Examiner—Stephen Chin
Assistant Examiner—Shuwang Liu
(74) Attorney, Agent, or Firm—Burns, Doane, Swecker & Mathis, L.L.P.

(57) ABSTRACT

Incoming signals in a receiver for Direct Sequence Code Division Multiple Access systems are despread using Offset-QPSK spreading as the transmitting spreading format combined with arbitrary data modulation formats, such as BPSK and QPSK. The receiver has a pseudonoise (PN) generator for generating a unique PN sequence signal. The PN sequence signal is divided into a real and an imaginary component. The complex input signal is divided into inphase and quadrature components. The inphase and the quadrature components of the input signal are downsampled to provide either two complex samples per chip period or one complex sample per chip period. In the latter case, the downsampling instants are delayed by a quarter of a chip period. Each downsampled complex signal is correlated with the corresponding segment of the complex PN sequence signal of the receiver. In the case where two samples per chip are provided after downsampling, the correlation values obtained for odd and even complex samples of the downsampled input signal are summed.

20 Claims, 6 Drawing Sheets

METHOD AND APPARATUS FOR DESPREADING OQPSK SPREAD SIGNALS

This invention relates generally to spread spectrum communication systems and, more particularly, to a method and apparatus for despreading Offset-QPSK (OQPSK) spread signals in a DS-CDMA receiver.

BACKGROUND

Traditionally, mobile radio communication systems have been optimised mainly towards speech services and just marginally towards data communication services. However, as an increased number of subscribers in the existing networks as well as requests for new kinds of services has emerged, capacity problems in the existing networks are foreseen. To meet the new flexibility and capacity requirements DS-CDMA (Direct Sequence Code Division Multiple Access) based technology has turned out to be a promising candidate for the choice of multiple access method adapted to the air interface of future mobile radio communication systems.

Compared to traditional systems where the users are separated by use of narrow or seminarrow frequency band combined with or without time division, in CDMA based systems each user is assigned a different pseudo-noise spreading sequence. This gives rise to a substantial increase in bandwidth of the information-bearing signal. Spread spectrum systems generally fall into one of two categories: frequency hopping (FH) or direct sequence (DS). This invention relates to DS-CDMA. Direct sequence is, in essence, multiplication of a conventional communication waveform by a pseudo-noise, real or complex, sequence in the transmitter.

Thus DS-CDMA systems use real or complex (polyphase) sequences as means to spread the bandwidth of a transmitted signal in order to achieve simultaneous operation of multiple users in the same frequency band. As is common in the art the complex spreading sequences (pseudo-noise) occupying the same spectrum for the different users are chosen to have certain correlation properties in order to interfere with each other as little as possible. In each receiver adapted to receive the transmitted signal in question the inverse operation of spreading the transmitted signal spectrum, called despreading, is performed in order to recover the original data signal and in the same time suppress the interference from the other users or, more generally, the other sources.

The despreading operation is performed prior to data demodulation and decoding and it is also the basic operation within the multipath delay search processor (searcher), which is an important part of a so-called RAKE receiver. The searcher is used to estimate the channel impulse response, to identify paths within a delay profile and to keep track of changing propagation conditions. A RAKE receiver should be able to capture most of the received signal energy by allocating a number of parallel demodulators to the selected strongest components of the received multipath signal. The allocation and time synchronisation of the demodulators are performed on the basis of the estimated channel response.

If the spreading sequence is real and binary (±1 element) then the spreading is called BPSK spreading (BPSK=Binary Phase Shift Keying), while when the spreading sequence is complex, i.e. consists of real and imaginary components which are both considered to be binary sequences, it is called QPSK spreading (QPSK=Quadrature Phase Shift Keying). Usually QPSK spreading is performed by multiplying the data with different real and imaginary binary sequences as described in the article "A Coherent Dual-Channel QPSK Modulation for CDMA Systems", by S. R. Kim et al, Proc. of VTC'96, Atlanta, pp 1848–1852. April 1996. Pulse shape filtering is usually performed in each of the quadrature branches of the system in order to adapt the spread signal to the transmission channel.

It is to be noted that QPSK spreading could be applied to either BPSK or QPSK data modulation format. Examples of both are given in the article mentioned above. For both data modulation formats the QPSK despreader is the same, i.e. multiplication of quadrature input samples with the complex conjugated spreading sequence and integration across a data symbol period.

This invention relates to a receiver adapted to receive signals with arbitrary data modulation formats spread by using Offset-QPSK (OQPSK) spreading. The OQPSK spreading differs from QPSK spreading by a half chip period delay in the imaginary (Q) branch of the spreader, after multiplication of the data symbol with the segment of complex spreading sequence. OQPSK spreading is used in the up-link of the so called IS-95 systems and is also discussed for third generation mobile systems.

A despreader for BPSK data modulation with Offset-QPSK spreading is discussed in D. M. Grieco, "The Application of Charge-Coupled Devices to Spread-Spectrum Systems," IEEE Transactions on Communications, Vol. 28, No. 9 (Chapter IIIC, pp 1699, FIG. 7). Another reference discussing the same matter is D-W Lee et al, "Development of the Base Station Transceiver Subsystem in the CDMA Mobile System", ETRI Journal, Vol. 19, No. 3, pp 116–140, October 1997.

PRIOR ART SYSTEM IN FIG. 1

FIG. 1 illustrates a prior art despreader according to the references mentioned above. A received signal is downconverted into its corresponding baseband representation and divided into inphase $y_I$ and quadrature $y_Q$ signal components. The signal components are further downsampled through downsampling means A1 and A2, respectively, to provide two complex samples per chip period, $T_c$, i.e. the duration of a complex PN sequence symbol. The received signal components are multiplied by multipliers A3, A4, A5, A6 with the real and imaginary parts $d_I(n)$ and $d_Q(n)$, respectively of the corresponding complex PN sequence symbol. Note that the signal components multiplied with the real PN sequence symbol component $d_I(n)$ are delayed half a chip period, in delay circuits A7 and A8, respectively, before the actual multiplications are performed. This is done in order to align the signal components. The resulting multiplied signals are combined, in combination circuits A9 and A10, respectively, downsampled with a factor 2, in downsampling means A11 and A12, respectively, and fed to the inputs of two summation circuits A13 and A14, respectively, which are performing a correlation operation. If the PN sequence of the received signal and the local replica generated by the receiver are synchronised, as will be described further on, the correlator provides a constructively combined signal which can be used for data demodulation and detection.

Assuming perfect synchronisation, and that the data signal and the complex PN sequence can be represented as $$d(n)=d_I(n)+jd_Q(n) \text{ and } s(k)=s_I(k)+js_Q(k)$$

respectively, it can be derived that the output from the correlator can be represented as:

$$z(n) = 2L \cdot \{d_r(n) + jp[T_c/2] \cdot d_Q(n)\} + 2d_Q(n) \sum [s_i(k)s_Q(k)] +$$

$$j \sum^L [W(k)_Q s_i(k) - W(k)_I s_Q(k)]$$

each integration ($\Sigma$) is made from k=nL to k=nL+L−1, where L is equal to the data symbol duration in chip periods. From this equation it can be seen that the inphase and quadrature components of the data signal d(n) are weighted differently. The quadrature component is weighted by a factor determined by the impulse response of the used pulse shaping filter. This constitutes no problem for the BPSK modulated signals where the quadrature phase signal usually carries no information, i.e. $d_Q(n)=0$. However, for signals utilising quadrature based modulation schemes, e.g. QPSK modulated signals, such weighting will make data demodulation difficult since the real and the imaginary parts of each data modulation symbol can not be demodulated with the same quality. It can also be seen from the equation above that the self-interference due to crosscorrelation between the real and imaginary PN sequences increase when quadrature data modulation is applied. Furthermore, the self-interference due to crosscorrelation between the real and imaginary PN sequences as well as the distortion due to interfering chip waveforms originating from adjacent chip intervals will be unevenly distributed between the real and imaginary parts of z(n). All these factors implies a reduced performance of the overall system if quadrature modulated signals are utilised with the despreader scheme specified.

Thus, summarizing, the existing OQPSK despreader known in the prior art has two major drawbacks when it is applied to the OQPSK spread-spectrum signals obtained for data modulation formats other than BPSK, i.e.:

a) The data bits contained in the real and imaginary parts of each data modulation symbol can not be demodulated with the same quality since the amplitudes after despreading are different in the real and imaginary part of the data modulation symbol due to the pulse shaping filter operation;

b) The self-interference due to the crosscorrelation of real and imaginary PN sequences is increased compared to the case when BPSK/OQPSK modulation/spreading is applied.

SUMMARY

An object of the invention is to provide an Offset-QPSK despreader scheme which can function independently of the data modulation format. Thus, the despreader in the receiver does not need to be changed if a change in data modulation format is done in the transmitting system, for instance in new systems developed in the future.

Another objective of the invention is to provide a computational efficient OQPSK despreader scheme tractable from an implementation point of view.

The object of the invention is thus to provide a despreader scheme valid for OQPSK spreading and QPSK and BPSK or any other complex data modulation format.

The technical field for the invention is to provide a method and a device for despreading incoming signals in a receiver for DS-CDMA systems (DS-CDMA=Direct Sequence Code Division Multiple Access) using Offset-QPSK spreading as the transmitting spreading format combined with arbitrary data modulation formats, such as BPSK and QPSK data modulation formats. The receiver has a unique PN sequence signal divided into a real and an imaginary component. The input base-band signal is divided into an inphase and a quadrature component, as common in the art. The invention is characterised in that complex correlations are performed between an OQPSK data signal and corresponding segments of a locally generated replica of the PN sequence used to spread the data signal. The invention is further characterised in that the inphase and the quadrature components of the input signal are downsampled to provide either two samples per chip period or one complex sample per chip period in which later case the down-sampling instants are delayed by a quarter of the chip period. Each downsampled complex signals is correlated with the corresponding segments of the complex PN sequence signal of the receiver. The correlation values obtained for odd and even complex samples of the downsampled input signal are summed, in the case when two samples per chip are provided after downsampling.

Each of the samples of the inphase and the quadrature components of the input signal, or a timeshifted version of them, could be multiplied with each of the real and an imaginary component of the PN spreading sequence of the receiver. The output of the multiplied inphase components version with the real PN spreading sequences and the output of the multiplied quadrature components with the imaginary PN spreading sequence are added to each other. The output of the multiplied quadrature components version with the imaginary PN spreading sequence and the output of the multiplied inphase components version with the imaginary PN spreading sequences are subtracted one from the other.

The invention was developed in order to provide a receiver adapted for systems using OQPSK spreading format. The inventive despreader has a good performance on AWGN and Rayleigh fading channels. It is valid for BPSK, QPSK or any other complex data modulation formats, which makes it important for future mobile communication systems.

BRIEF DESCRIPTION OF THE DRAWINGS

For a more complete understanding of the present invention and for further objects and advantages thereof, reference is now made to the following description taken in conjunction with the accompanying drawings, in which.

DETAILED DESCRIPTION

Figure 1:
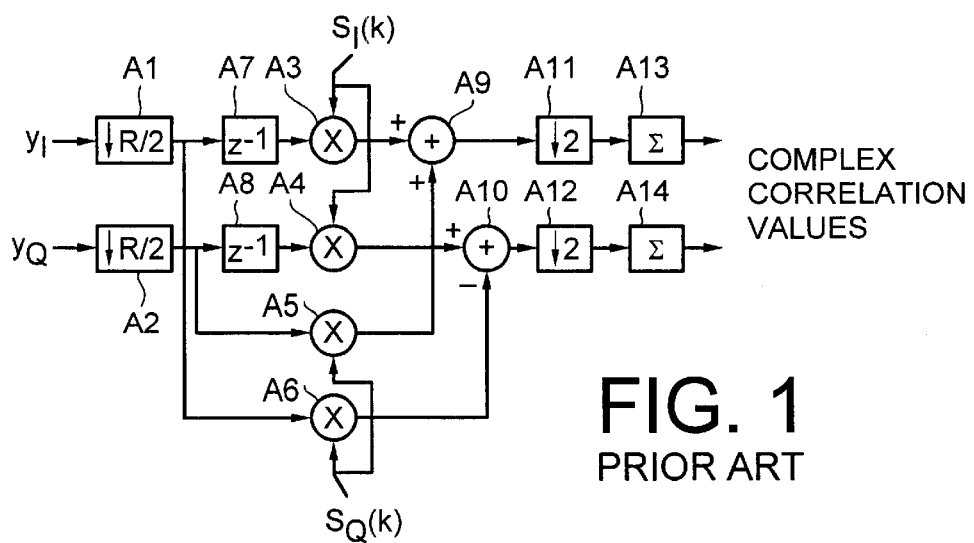
FIG. 1 illustrates a prior art despreader for OQPSK spread BPSK data modulated signals.
Figure 2A:
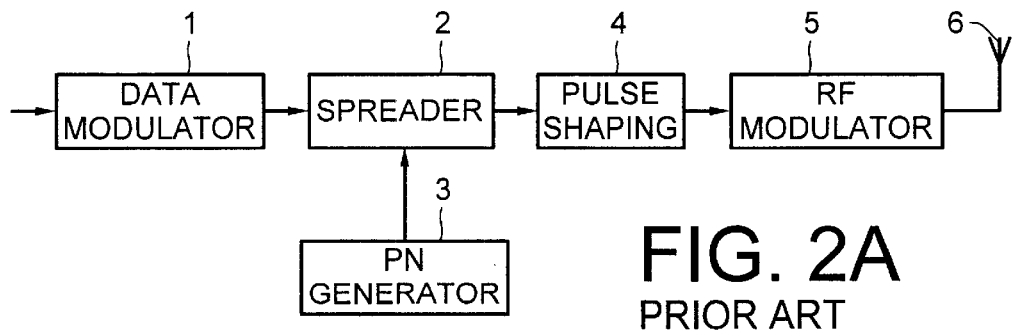
FIG. 2A illustrates a generic transmitter structure for a system using OQPSK spreading format.

Generic DS-CDMA Transmitter Structure, FIG. 2A

The transmitter for sending OQPSK spread data is illustrated in FIG. 2A. The signal to be transmitted is fed to a data modulator 1. The modulated signal is spread with a complex PN spreading sequence signal s(k) in the spreader 2, controlled by a complex PN generator 3 generating the PN sequence signal:

$$s(k)=s_I(k)+js_Q(k)$$

which is unique for each physical transmission channel established in the system. This means that each receiving unit usually has its own PN sequence. This sequence is provided to the receiver in the beginning of an information exchange session, i.e. during the initial signalling. It is usually valid for a whole session, although it may also be changed for various reasons. The signal from the spreader 2 is fed through a pulse shaping filter 4 and an RF modulator 5 to an antenna 6.

The function of the circuitry in FIG. 2A is apparent from the following discussion. Assume, without loss of generality, that in a transmitter for sending information to be received by a receiver according to the invention, the data modulation format before spreading is QPSK. During the n:th data symbol period, a data symbol d(n) can then be represented by its real and imaginary components as $$d(n)=d_I(n)+j\,d_Q(n)\ d_I(n),\ d_Q(n)\in(\pm 1) \quad (1)$$

Let us also assume that the complex PN spreading sequence s(k) can be represented during the k:th chip period as $$s(k)=s_I(k)+j\,s_Q(k)\ s_I(k),\ s_Q(k)\in(\pm 1) \quad (2)$$

The signal x'(k) obtained after the QPSK spreading is equal to $$x'(k)=[d_I(n)+j\,d_Q(n)][s_I(k)+j\,s_Q(k)]=[d_I(n)\,s_I(k)-d_Q(n)\,s_Q(k)]+j\,[d_Q(n)\,s_I(k)+d_I(n)\,s_Q(k)] \quad (3)$$

To obtain the OQPSK spread signal x(k) the imaginary component of the signal x'(k) is delayed by half a chip period. For simplicity and without loss of generality, let us assume that the number of samples within the chip period, before the pulse shaping lowpass filter 4 at the output, is equal to two. In such a case the signal before the pulse shaping filter can be represented as $$x(k)_{odd}=[d_I(n)\,s_I(k)-d_Q(n)\,s_Q(k)]+j*0$$

$$x(k)_{even}=0+j[d_Q(n)\,s_I(k)+d_I(n)\,s_Q(k)] \quad (4)$$

whereby, $x(k)_{odd}$ represents a reference to x(k) when the index k is odd, and $x(k)_{even}$ represents a reference to x(k) when the index k is even.

The samples of the I and Q branches (the real and imaginary components of the signal x(k)) are passed through corresponding pulse shaping filters 4 in order to obtain a signal to be transmitted with a frequency spectrum which satisfies the limits of the allocated transmit frequency band. In the transmitter the signal is interpolated (up-sampled) to an arbitrary number of samples per chip in the pulse shaping filter in order to have a good pulse form before they are fed to the RF modulator 5 for transmitting the signals to the receiver.

Figure 2B:
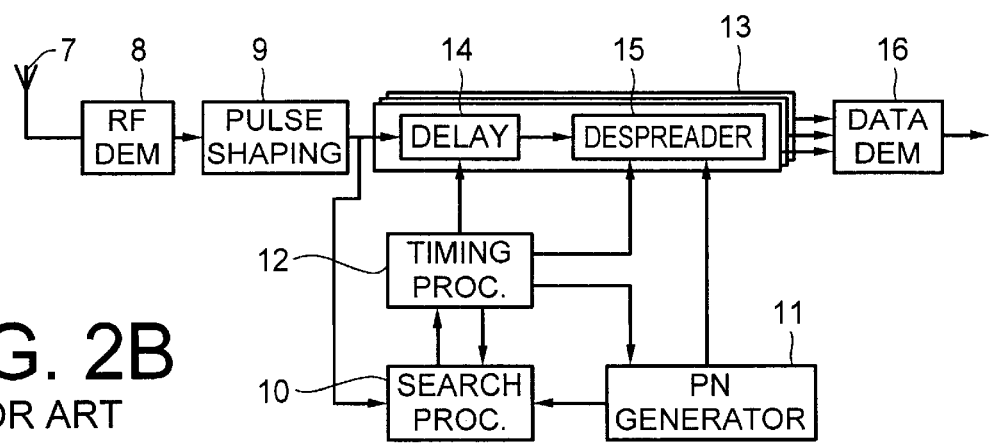
FIG. 2B illustrates a generic receiver structure for a system using OQPSK spreading format.

Generic DS-CDMA Receiver Structure, FIG. 2B

The signal transmitted from the antenna 6 is received by an antenna 7 and fed through an RF demodulator 8 to a pulse shaping filter 9. The low frequency output from the filter 9 is fed to a search processor 10 controlled by a PN generator 11 which produces the unique PN sequence signal for the receiver and adapted to the PN sequence signal used by the transmitter when it is communicating with the actual receiver.

The search processor 10 correlates the signals from the filter 9 with a delayed replica of the receiver PN sequence. Its goal is to identify the multipath components of the receiver signal and estimate their corresponding delays.

The strongest identified multipath components are despread by separate despreader units 13, also called RAKE fingers, i.e. parallel processing units each having a variable delay circuit 14 and a despreader circuit 15, by using a replica of the receiver PN sequence which is delayed according to the delay values obtained from the search processor 10. The outputs of all the despreaders 15 are combined in a constructive way before demodulation.

As long as the received sequence signals do not include the right PN sequence signal the timing processor 12 controls only the PN generator 11 and the search processor 10.

When the correct PN sequence signal is detected and the receiving timing is estimated by the search processor, the timing processor 12 starts to control the despreader units 13 using the adequate timing for its internal circuits.

The PN sequence signal from the PN generator is fed to each despreader circuit 15. The timing processor 12 provides the timing signals to the individual circuits 10, 11, 14, 15 at times adaptable to receive and process the transmitted information for the receiver in question. The despread signals from the despreading units 13 are fed to a data demodulator 16 which recovers the transmitted information.

The invention relates to a despreader to be provided as the despreader circuit in each of the despreading units 13 and in the search processor 10. The embodiments below show methods to despread the signals obtained by combination of OQPSK spreading with arbitrary data modulation format (e.g. having OQPSK spreading either to BPSK or QPSK data modulation format). This is provided by downsampling the incoming signals to provide either two complex samples per chip or one complex sample per chip (in which case the downsampling instants are delayed by a quarter of a chip period), then by making a complex correlation of such downsampled signals with the corresponding segments of the complex PN sequence signal of the receiver, and by summation of odd and even correlation values in the case when two samples per chip are provided after downsampling.

Figure 3:
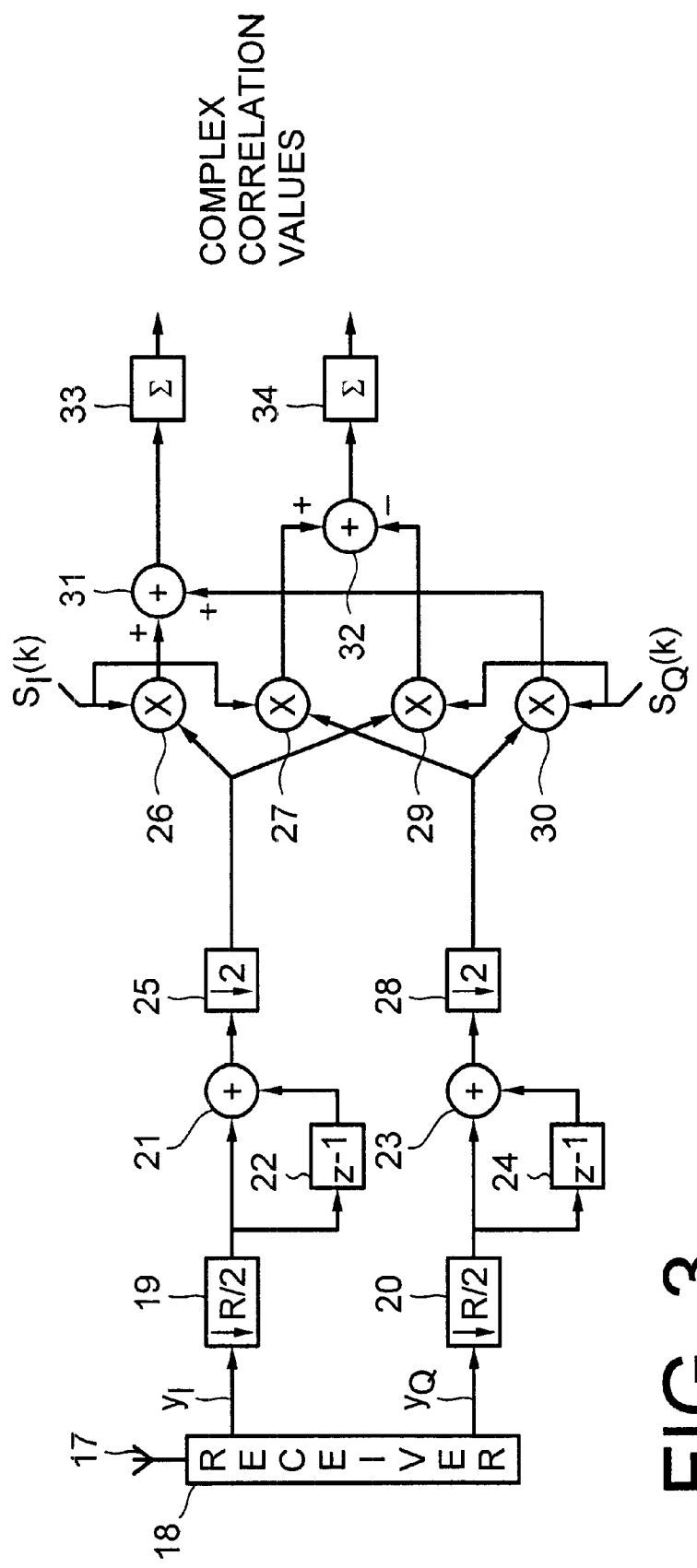
FIG. 3 illustrates a first embodiment of the despreader unit in a receiver according to the invention.

First Embodiment, FIG. 3

In the embodiment of the receiver according to the invention shown in FIG. 3, the received signal from the antenna 17 is down-converted in the circuitry and divided into inphase (I) and quadrature (Q) components, which are sampled, passed through filters, matched to the pulse shaping waveform and converted into R samples per chip resulting in the components $y_I$ and $y_Q$, as common in the art.

The component $y_I$ is down-sampled with a ratio R/2 in a down-sampling means 19 to obtain two samples per chip (PN sequence symbol). The component $y_Q$ is down-sampled with a ratio R/2 in a down-sampling means 20 to obtain two samples per chip. If the pulse shaping filters at the output of the transmitter satisfies the Nyquist criterion for intersymbol interference free transmission, and a perfect sample synchronisation established in the receiver 18 is assumed then the odd-numbered complex samples $y(k)_{odd}$ at the output of the down-sampling means 19 and 20 can be represented as $$y(k)_{odd}=[d_I(n)\ s_I(k)-d_Q(n)\ s_Q(k)]\cdot Ce^{j\theta}++\{j\ p(-T_c/2)\cdot[d_Q(n)\ s_I(k)+d_I(n)\ s_Q(k)]+j\ W_Q(k)\}\cdot Ce^{j\theta} \quad (5)$$

while the even-numbered complex samples $y(k)_{even}$ at the output of the down-sampling means 19 and 20 can be represented as $$y(k)_{even}=\{p(T_c/2)\cdot[d_I(n)\ s_I(k)-d_Q(n)\ s_Q(k)]+W_I(k)\}\cdot Ce^{j\theta}++j\ [d_Q(n)\ s_I(k)+d_I(n)\ s_Q(k)]\cdot Ce^{j\theta} \quad (6)$$

where $p(t)$, $t=0, \pm T_s, \pm 2T_s, \ldots$ is the chip waveform after the receiver pulse shaping matched filter sampled at sampling intervals $T_s$. It is assumed during the derivations, without loss of generality, that $t=0$ corresponds to the pulse maximum, i.e. $p(0)=1$. If the chip period is denoted as $T_c$, then the sampling interval satisfies $T_s=T_c/R$. $W_I(k)$ and $W_Q(k)$ are distortion terms in the I and Q branches caused by the chip waveforms from the adjacent chip intervals. The influence of the communication channel is modelled by a multiplication of the transmitted signal with a complex valued number $C\cdot e^{j\theta}$. FIG. 3, as well as the other embodiments, represents an implicit realisation of the equations in the text.

Figure 4:
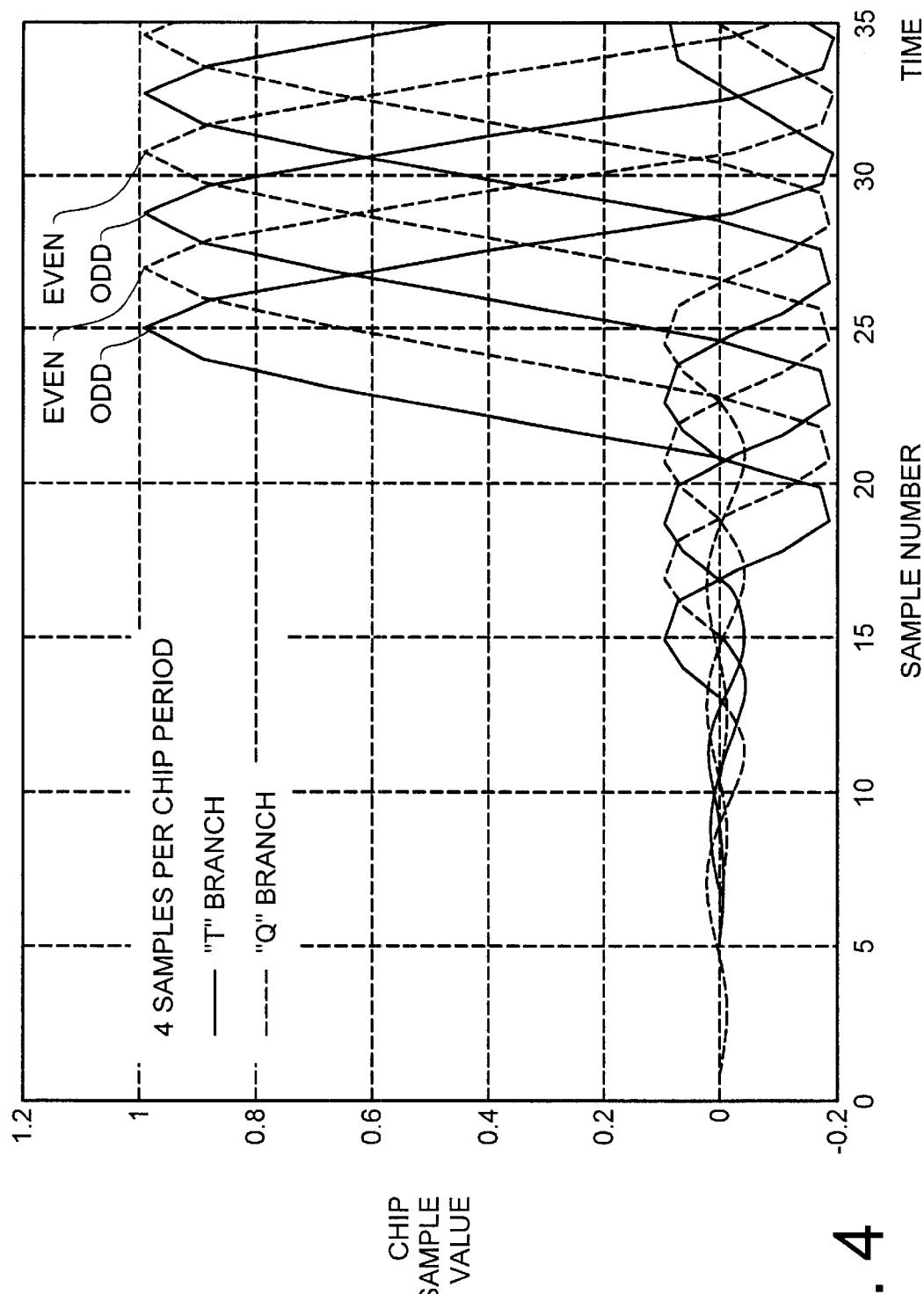
FIG. 4 illustrates chip pulse waveforms after pulse shaping matched filtering in the quadrature branches of an OQPSK despreader according to the invention.

FIG. 4 shows the chip pulse waveforms after the pulse shaping matched filters in the receiver 18 at sampling intervals $T_s$. The waveforms drawn with continuous lines represent the response corresponding to odd samples while the waveforms drawn with dashed lines represent the response corresponding to even samples.

The signal $z(n)_{odd}$ obtained by multiplying the odd-numbered complex input samples by the complex conjugate of the PN spreading sequence and integrating the results during a given time interval can be expressed as $$z(n)_{odd}=\Sigma y(k)_{odd}\cdot[s_I(k)+j\ s_Q(k)]=$$

$$=[1+p(-T_c/2)]\cdot[d_I(n)+j\ d_Q(n)]\cdot L\cdot Ce^{j\theta}-$$

$$-[1-p(-T_c/2)]\cdot[d_Q(n)+j\ d_I(n)]\cdot Ce^{j\theta}\cdot\Sigma[s_I(k)\cdot s_Q(k)]+$$

$$+Ce^{j\theta}\cdot\Sigma j\cdot W(k)_Q\cdot[s_I(k)-j\ s_Q(k)] \quad (7)$$

where it is assumed that the integration length L is equal to the data symbol duration divided by $T_c$, and each integration ($\Sigma$) is made from $k=n\cdot L$ to $k=n\cdot L+L-1$. In a similar way, the signal $z(n)_{even}$ can be represented as $$z(n)_{even}=[1+p(T_c/2)]\cdot[d_I(n)+j\cdot d_Q(n)]\cdot L\cdot Ce^{j\theta}+$$

$$+[1-p(T_c/2)]\cdot[d_Q(n)+j\ d_I(n)]\cdot Ce^{j\theta}\cdot\Sigma[s_I(k)\cdot s_Q(k)]+$$

$$+Ce^{j\theta}\cdot\Sigma W(k)_I\cdot[s_I(k)-j\ s_Q(k)] \quad (8)$$

The equations (7) and (8) show that the despread signal consists of three components (placed on three different lines in each equation). The first part of the equations is the desired component containing the complex data symbol multiplied by the channel response and by the integration length.

The second component is the crosscorrelation interference caused by the crosscorrelation between the quadrature PN spreading sequences within the n:th data symbol interval. For any symmetrical pulse shaping waveform, such as the raised cosine waveform shown in FIG. 4, it stands that $p(T_c/2)=p(-T_c/2)$. Thus the crosscorrelation interference terms in $z(n)_{odd}$ and $z(n)_{even}$ have the same values but with the opposite signs. To obtain the despread signal without crosscorrelation interference, regardless of the actual crosscorrelation properties of the quadrature spreading sequences, it is enough to add $z(n)_{odd}$ and $z(n)_{even}$ parts within the n:th data symbol interval. This operation is performed implicitly by the operation of the means means 21 to 24 in FIG. 3.

The third term is an inter-symbol interference term caused by the chip waveforms from the adjacent chip intervals in the opposite quadrature branch.

Thus, returning to the circuit in FIG. 3, in order to provide the signalling features expressed by the equations above, the output of the down-sampling means 19 is connected to one input of an adder 21 and to a delay circuit 22 having its output connected to another input of the adder 21. The output of the down-sampling means 20 is connected to one input of an adder 23 and to a delay circuit 24 having its output connected to another input of the adder 23. The delay circuits 22 and 24 delay the signal one sample. Therefore, each of the adders 21 and 23, respectively, add the actual sample with a previous one in order to have only one sample per chip to process further on.

The output of the adder 21 is connected through a down-sampling means 25 with the ratio 2/1 to one input of a multiplier 26 and to one input of a multiplier 29. The output of the adder 23 is connected through a down-sampling means 28 with the ratio 2/1 to one input of a multiplier 27 and to one input of a multiplier 30. A signal $s_I(k)$, i.e. the real component of the receiver PN sequence signal $s(k)$, is connected to the other input of the multipliers 26 and 27. A signal $s_Q(k)$, i.e. the imaginary component of the receiver PN sequence signal $s(k)$, is connected to the other input of the multipliers 29 and 30. The outputs of the multipliers 26 and 30 are connected to an (+)-input each of an adder 31, and the outputs of the multipliers 27 and 29 are connected to a (+)-input and a (−)-input, respectively, of an adder 32.

Each output of these adders 31 and 32 is then connected to an integration device 33 and 34, respectively, having an integration length equal to the data symbol duration L. The summarised output from the despreader shown in FIG. 3 can be represented as $$z(n)=2\cdot[1+p(T_c/2)]\cdot[d_I(n)+j\cdot d_Q(n)]\cdot L\cdot Ce^{j\theta}++Ce^{j\theta}\cdot\Sigma[W(k)_I+j\cdot W(k)_Q]\cdot[s_I(k)-j\ s_Q(k)] \quad (9)$$

Figure 5:
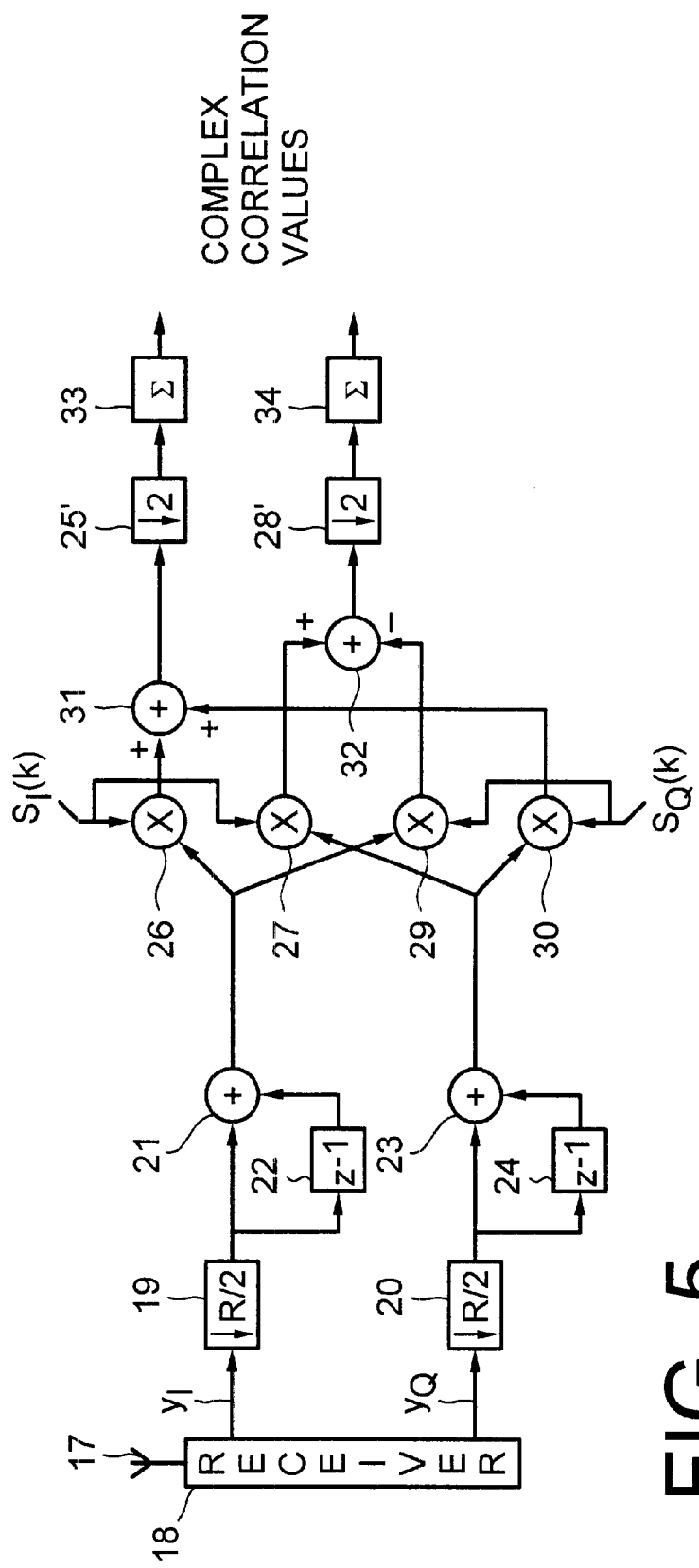
FIG. 5 illustrates a second embodiment of the despreader unit in a receiver according to the invention.

Second Embodiment, FIG. 5

It is to be noted that practically the same result could be provided if the down-sampling means 25 is moved to a position between the elements 31 and 33 and the down-sampling means 28 is moved to a position between the elements 32 and 34 as illustrated in FIG. 5, where the moved down-sampling means in question have the references 25' and 28'. Other kinds of embodiments could be created, for instance by moving the elements 21, 22 to positions between the elements 26 and 31 and between the elements 29 and 32 and between 31 and 25' and the elements 23, 24 to positions between the elements 30 and 31 and between 27 and 32 or between 32 and 28', as is evident for the person skilled in the art.

Figure 6:
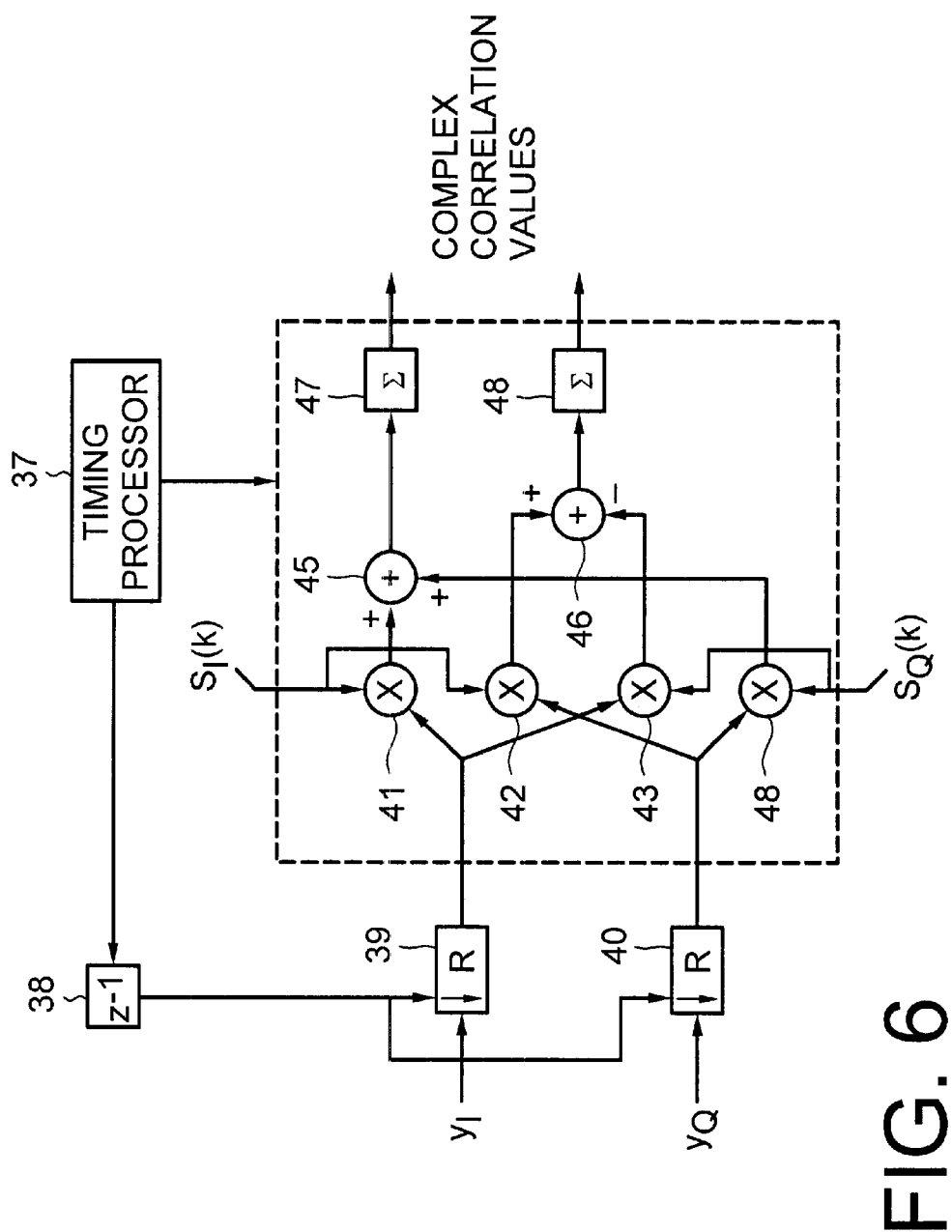
FIG. 6 illustrates a third embodiment of the despreader unit in a receiver according to the invention.

Third Embodiment, FIG. 6

From the equations above it is apparent that the cross-correlation interference will disappear both in the odd and even output samples, if the quadrature spreading sequences are chosen to have certain correction properties, e.g. orthogonal, under the condition that the integration length is equal to the sequence length or a multiple thereof.

Furthermore, even if the quadrature spreading sequences are not orthogonal it is possible to cancel the crosscorrelation interference by delaying the sampling phase for $\delta=T_c/4$. This is illustrated in the embodiment shown in FIG. 6, in which the part including the elements 41 to 46 is the same as in FIG. 3 (comprising the elements 26 to 34). The timing processor 37 for the despreader circuit as a whole is shown connected to a delay circuit 38 delaying the clock signal from the processor by $\delta=T_c/4$. It is to be noted that this is a way to illustrate the difference between this embodiment and the other embodiments and that thus the delay circuit 38 actually is a part of the timing processor.

The delayed clock signal is provided to a down-sampling means 39 having the down-sampling ratio R between the signal $y_I$ to the circuit 39 and the inputs of the multipliers 41 and 43 and to a down-sampling means 40 also having the down-sampling ratio R between the signal $y_Q$ to the circuit 40 and the inputs of the multipliers 42 and 44. It is to be noted that there is only need for two down-sampling means in this embodiment, as well as a reduced number of adders and a reduced processing speed. The integrating devices 47 and 48 corresponding to the devices 33 and 34 in FIG. 3 are connected directly to the output of the element 45 and 46, respectively.

When one sample per chip is provided before the actual despreader after the elements 39 and 40 the output signal from the despreader can be represented as $$z(n)=[p(T_c/4)+p(-T_c/4)]\cdot[d_I(n)+j\cdot d_Q(n)]\cdot L\cdot Ce^{j\theta}+ \qquad (10)$$
$$+[p(T_c/4)-p(-T_c/4)]\cdot[d_Q(n)+j\cdot d_I(n)]\cdot Ce^{j\theta}\cdot \Sigma[s_I(k)\cdot s_Q(k)]+$$
$$+Ce^{j\theta}\cdot\Sigma[W(k)_I+j\cdot W(k)_Q]\cdot[s_I(k)-j\ s_Q(k)]$$

As $p(T_c/4)=p(-T_c/4)$, the relation above recduces to $$z(n)=2\cdot[p(T_c/4)]\cdot[d_I(n)+j\cdot d_Q(n)]\cdot L\cdot Ce^{j\theta}+$$
$$+Ce^{j\theta}\cdot\Sigma[W(k)_I+j\cdot W(k)_Q]\cdot[s_I(k)-j\ s_Q(k)] \qquad (11)$$

PERFORMANCE

Finally, the performance with additive white Gaussian noise is also an item which should be taken into account in a comparison between the schemes in FIGS. 3 and 5 and the FIG. 6. Namely, the addition of the odd and even consecutive samples within the chip period, as it is done in FIG. 3, may provide an improved signal-to-noise ratio (SNR) at the despreader output. This will be the case only if the noise samples are uncorrelated. However, the pulse shaping matched filter in the receiver means that the noise samples within the chip period are in fact correlated. Furthermore, it can be shown that the signal-to-noise gain of a coherent integrator (as any despreader actually could be regarded as) is proportional to the integration time (see for instance K. S. Miller and R. I. Bernstein, "An Analysis of Coherent Integration and Its Application to Signal Detection", IRE Transactions on Information Theory, pp 237–248, December 1957).

Figure 7:
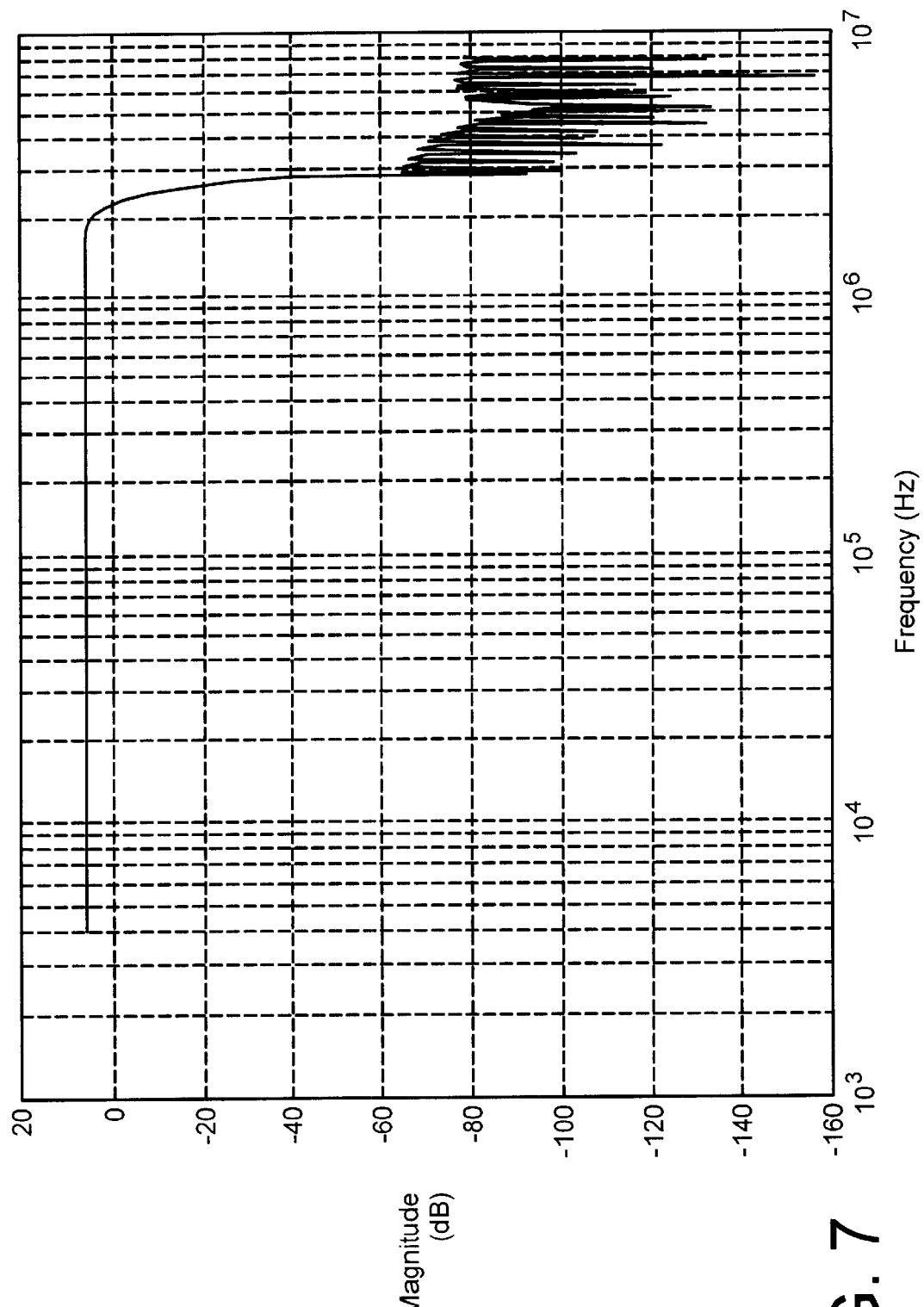
FIG. 7 is a graph of the frequency characteristics of the pulse shaping filter.

Therefore, the two kinds of embodiments mentioned above should have practically the same performance with noise if the integration length L is large enough. The despreader embodiments in FIGS. 3 and 6 were simulated assuming a spreading sequence chip rate $f_{chip}=4.096$ Mbps and a sampling frequency in the receiver $F_s=4\cdot f_{chip}$. The chip pulse waveform after the matched filter, designed with the assumption of having four samples per chip period, is shown in FIG. 5. The filter spectral magnitude characteristics directly matches a root raised cosine shape down to −10 dB, as can be seen from FIG. 7.

The overall performance evaluation of the despreader embodiments in FIGS. 3 and 6 was done by finding the bit-error rate (BER) which they provide on the communication channels. It has been found that both embodiments have practically the same performance.

Compared with QPSK despreading the OQPSK despreader implemented by the two embodiments in FIGS. 3 and 6 introduces a loss of 0.9 dB when QPSK data modulation is employed at a transmitter in both cases.

Although the invention is described with respect to exemplary embodiments it should be understood that modifications can be made without departing from the scope thereof. Accordingly, the invention should not be considered to be limited to the described embodiments, but defined only by the following claims which are intended to embrace all equivalents thereof.

What is claimed is:

1. In a receiver in a spread spectrum communication system, a device for despreading an Offset QPSK (OQPSK) spread data signal, the OQPSK spread data signal being spread by a complex pseudonoise sequence and divided into an inphase and a quadrature phase component, the pseudonoise sequence being divided into chip periods, the device for despreading upon reception of the OQPSK spread data signal in the receiver comprising:

means for generating samples of the quadrature and the inphase components;

means for downsampling the quadrature and the inphase components to provide two complex samples of each of the quadrature and the inphase components per chip period, termed the odd and even complex samples;

delaying means for delaying at least one of the odd complex samples or the even complex samples of the downsampled signals of the inphase component;

adding means for adding the delayed downsampled signal of the inphase component to a non-delayed down-sampled signal of the inphase component;

means for performing a complex correlation between a segment of the samples corresponding to at least one data symbol period of the OQPSK spread data signal and a corresponding segment of the complex pseudonoise sequence; and means for generating correlation values based on the results of the complex correlation.

2. In a receiver in a spread spectrum communication system, a device for despreading an Offset QPSK (OQPSK) spread data signal, the OQPSK spread data signal being spread by a complex pseudonoise sequence and divided into an inphase and a quadrature phase component, the pseudonoise sequence being divided into chip periods, the device for despreading upon reception of the OQPSK spread data signal in the receiver comprising:

means for generating samples of the quadrature and the inphase components;

means for downsampling the quadrature and the inphase components to provide two complex samples of each of the quadrature and the inphase components per chip period, termed the odd and even complex samples;

delaying means for delaying at least one of the odd complex samples or the even complex samples of the downsampled signals of the quadrature component;

adding means for adding the delayed downsampled signal of the quadrature component to a non-delayed down-sampled signal of the quadrature component;

means for performing a complex correlation between a segment of the samples corresponding to at least one data symbol period of the OQPSK spread data signal and a corresponding segment of the complex pseudonoise sequence; and means for generating correlation values based on the results of the complex correlation.

3. In a receiver in a spread spectrum communication system, a device for despreading an Offset QPSK (OQPSK) spread data signal, the OQPSK spread data signal being spread by a complex pseudonoise sequence and divided into an inphase and a quadrature phase component, the pseudonoise sequence being divided into chip periods, the device for despreading upon reception of the OQPSK spread data signaling the receiver comprising:

means for generating samples of the inphase and quadrature components;

means for downsampling the samples at downsample instants that are delayed by a quarter of a chip period, thereby providing one complex sample per chip period;

delaying means for delaying the downsampled signals of the inphase component;

adding means for adding the delayed downsampled signal of the inphase component to a non-delayed downsampled signal of the inphase component;

means for performing a complex correlation between a segment of the samples corresponding to at least one data symbol period of the OQPSK spread data signal and a corresponding segment of the complex pseudonoise sequence; and means for generating correlation values of the complex correlation.

4. In a receiver in a spread spectrum communication system, a device for despreading an Offset QPSK (OQPSK) spread data signal, the OQPSK spread data signal being spread by a complex pseudonoise sequence and divided into an inphase and a quadrature phase component, the pseudonoise sequence being divided into chip periods, the device for despreading upon reception of the OQPSK spread data signaling the receiver comprising:

means for generating samples of the inphase and quadrature components;

means for downsampling the samples at downsample instants that are delayed by a quarter of a chip period, thereby providing one complex sample per chip period;

delaying means for delaying the downsampled signals of the quadrature component;

adding means for adding the delayed downsampled signal of the quadrature component to a non-delayed downsampled signal of the quadrature component;

means for performing a complex correlation between a segment of the samples corresponding to at least one data symbol period of the OQPSK spread data signal and a corresponding segment of the complex pseudonoise sequence; and means for generating correlation values of the complex correlation.

5. In a receiver in a spread spectrum communication system, a method for despreading an Offset QPSK (OQPSK) spread data signal, the OQPSK spread data signal being spread by a complex pseudonoise sequence and divided into an inphase and a quadrature phase component, the pseudonoise sequence being divided into chip periods, the method for despreading upon reception of the OQPSK spread data signal in the receiver comprising the steps of:

generating samples of the quadrature and the inphase components;

downsampling the quadrature and the inphase components to provide two complex samples of each of the quadrature and the inphase components per chip period, termed the odd and even complex samples;

delaying at least one of the odd complex samples or the even complex samples of the downsampled signals of the inphase component;

adding the delayed downsampled signal of the inphase component to a non-delayed downsampled signal of the inphase component;

performing a complex correlation between a segment of the samples corresponding to at least one data symbol period of the OQPSK spread data signal and a corresponding segment of the complex pseudonoise sequence; and generating correlation values based on the results of the complex correlation.

6. The method of claim 5, wherein the step of performing complex correlation comprises:

multiplying each of the samples of the inphase and quadrature components with each of a real and imaginary component of the complex pseudonoise spreading sequence;

adding an output of the multiplication of an inphase component with a real component of the spreading sequence and an output of the multiplication of a quadrature component with an imaginary component of the pseudonoise sequence; and subtracting an output of the multiplication of an inphase component with an imaginary component of the spreading sequence from an output of the multiplication of a quadrature component with a real component of the spreading sequence.

7. The method of claim 6, wherein the added output and the subtracted output are integrated over at least a data symbol duration, thereby cancelling cross correlation terms.

8. In a receiver in a spread spectrum communication system, a method for despreading an Offset QPSK (OQPSK) spread data signal, the OQPSK spread data signal being spread by a complex pseudonoise sequence and divided into an inphase and a quadrature phase component, the pseudonoise sequence being divided into chip periods, the method for despreading upon reception of the OQPSK spread data signal in the receiver comprising the steps of:

generating samples of the quadrature and the inphase components;

downsampling the quadrature and the inphase components to provide two complex samples of each of the quadrature and the inphase components per chip period, termed the odd and even complex samples;

delaying at least one of the odd complex samples or the even complex samples of the downsampled signals of the quadrature component;

adding the delayed downsampled signal of the quadrature component to a non-delayed downsampled signal of the quadrature component;

performing a complex correlation between a segment of the samples corresponding to at least one data symbol period of the OQPSK spread data signal and a corresponding segment of the complex pseudonoise sequence; and generating correlation values based on the results of the complex correlation.

9. The method of claim 8, wherein the step of performing complex correlation comprises:

multiplying each of the samples of the inphase and quadrature components with each of a real and imaginary component of the complex pseudonoise spreading sequence;

adding an output of the multiplication of an inphase component with a real component of the spreading sequence and an output of the multiplication of a quadrature component with an imaginary component of the pseudonoise sequence; and subtracting an output of the multiplication of an inphase component with an imaginary component of the spreading sequence from an output of the multiplication of a quadrature component with a real component of the spreading sequence.

10. The method of claim 9, wherein the added output and the subtracted output are integrated over at least a data symbol duration, thereby cancelling cross correlation terms.

11. In a receiver in a spread spectrum communication system, a method for despreading an Offset QPSK (OQPSK) spread data signal, the OQPSK spread data signal being spread by a complex pseudonoise sequence and divided into an inphase and a quadrature phase component, the pseudonoise sequence being divided into chip periods, the method for despreading upon reception of the OQPSK spread data signaling the receiver comprising the steps of:

generating samples of the inphase and quadrature components;

downsampling the samples at downsample instants that are delayed by a quarter of a chip period, thereby providing one complex sample per chip period;

delaying the downsampled signals of the inphase component;

adding the delayed downsampled signal of the inphase component to a non-delayed downsampled signal of the inphase component;

performing a complex correlation between a segment of the samples corresponding to at least one data symbol period of the OQPSK spread data signal and a corresponding segment of the complex pseudonoise sequence; and generating correlation values of the complex correlation.

12. The method of claim 11, wherein the step of performing complex correlation comprises:

multiplying each of the samples of the inphase and quadrature components with each of a real and imaginary component of the complex pseudonoise spreading sequence;

adding an output of the multiplication of an inphase component with a real component of the spreading sequence and an output of the multiplication of a quadrature component with an imaginary component of the pseudonoise sequence; and subtracting an output of the multiplication of an inphase component with an imaginary component of the spreading sequence from an output of the multiplication of a quadrature component with a real component of the spreading sequence.

13. The method of claim 12, wherein the added output and the subtracted output are integrated over at least a data symbol duration, thereby cancelling cross correlation terms.

14. In a receiver in a spread spectrum communication system, a method for despreading an Offset QPSK (OQPSK) spread data signal, the OQPSK spread data signal being spread by a complex pseudonoise sequence and divided into an inphase and a quadrature phase component, the pseudonoise sequence being divided into chip periods, the method for despreading upon reception of the OQPSK spread data signaling the receiver comprising the steps of:

generating samples of the inphase and quadrature components;

downsampling the samples at downsample instants that are delayed by a quarter of a chip period, thereby providing one complex sample per chip period;

delaying the downsampled signals of the quadrature component;

adding the delayed downsampled signal of the quadrature component to a non-delayed downsampled signal of the quadrature component;

performing a complex correlation between a segment of the samples corresponding to at least one data symbol period of the OQPSK spread data signal and a corresponding segment of the complex pseudonoise sequence; and generating correlation values of the complex correlation.

15. The method of claim 14, wherein the step of performing complex correlation comprises:

multiplying each of the samples of the inphase and quadrature components with each of a real and imaginary component of the complex pseudonoise spreading sequence;

adding an output of the multiplication of an inphase component with a real component of the spreading sequence and an output of the multiplication of a quadrature component with an imaginary component of the pseudonoise sequence; and subtracting an output of the multiplication of an inphase component with an imaginary component of the spreading sequence from an output of the multiplication of a quadrature component with a real component of the spreading sequence.

16. The method of claim 15, wherein the added output and the subtracted output are integrated over at least a data symbol duration, thereby cancelling cross correlation terms.

17. In a receiver in a spread spectrum communication system, a method for despreading an Offset QPSK (OQPSK) spread data signal, the OQPSK spread data signal being spread by a complex pseudonoise sequence and divided into an inphase component and a quadrature phase component, the pseudonoise sequence being divided into chip periods, the method for despreading upon reception of the OQPSK spread data signal in the receiver comprising the steps of:

downsampling the inphase components and the quadrature components to provide two complex samples per chip period, termed the odd and even complex samples;

summing the odd and the even complex samples, thereby removing cross-correlation interference;

performing a complex correlation between a segment of the samples corresponding to at least one data symbol period of the OQPSK spread data signal and a corresponding segment of the complex pseudonoise sequence, wherein the step of performing complex correlation comprises:

multiplying each of the samples of the inphase and quadrature components with each of a real and imaginary component of the complex pseudonoise spreading sequence;

adding an output of the multiplication of an inphase component with a real component of the spreading sequence and an output of the multiplication of a quadrature component with an imaginary component of the pseudonoise sequence; and subtracting an output of the multiplication of an inphase component with an imaginary component of the spreading sequence from an output of the multiplication of a quadrature component with a real component of the spreading sequence;

integrating the added output and the subtracted output over at least a data symbol duration, thereby cancelling cross correlation terms; and generating correlation values based on the results of the complex correlation.

18. The method of claim 17, wherein the OQPSK spread data signal is a QPSK modulated data signal.

19. The method of claim 17, wherein the OQPSK spread data signal is a BPSK modulated data signal.

20. The method of claim 17, wherein the spread spectrum communication system is a Direct Sequence Code Division Multiple Access system.

* * * * *